Figure 1:
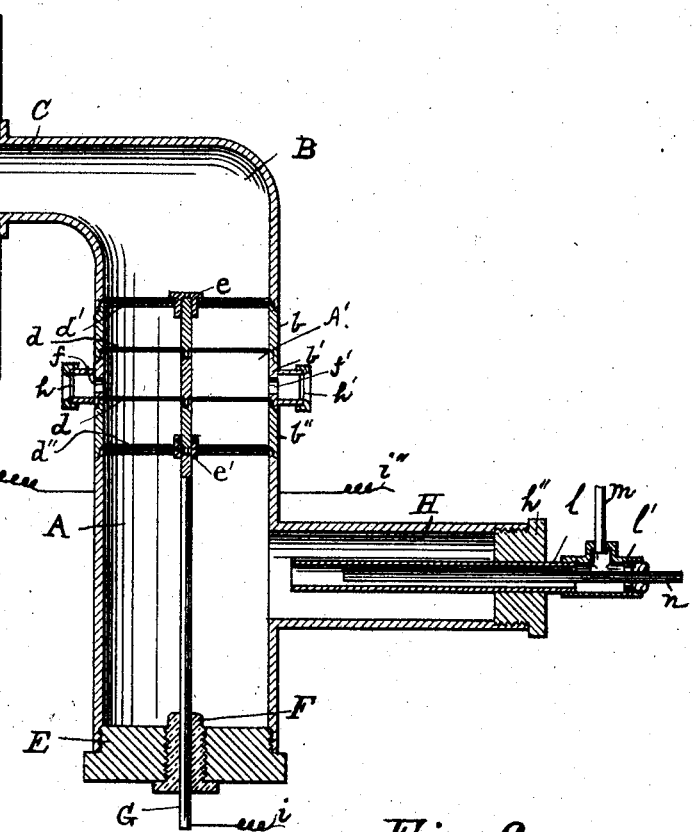

No. 778,099. PATENTED DEC. 20, 1904.
H. S. BLACKMORE.
PROCESS OF MAKING SULFUR TRIOXID.
APPLICATION FILED MAY 11, 1901.
NO MODEL. 2 SHEETS—SHEET 1.

Witnesses:
Warren C. Stone
H. N. Jenkins

Inventor:
Henry Spencer Blackmore

No. 778,099. PATENTED DEC. 20, 1904.
H. S. BLACKMORE.
PROCESS OF MAKING SULFUR TRIOXID.
APPLICATION FILED MAY 11, 1901.

No. 778,099.                                    Patented December 20, 1904.

UNITED STATES PATENT OFFICE.

HENRY SPENCER BLACKMORE, OF MOUNT VERNON, NEW YORK.

PROCESS OF MAKING SULFUR TRIOXID.

SPECIFICATION forming part of Letters Patent No. 778,099, dated December 20, 1904.

Application filed May 11, 1901. Serial No. 59,814.

*To all whom it may concern:*

Be it known that I, HENRY SPENCER BLACKMORE, a citizen of the United States, residing at 206 South Ninth avenue, Mount Vernon, in the county of Westchester and State of New York, have invented certain new and useful Improvements in Processes of Making Sulfur Trioxid; and I do hereby declare the following to be a full, clear, and exact description of the invention, such as will enable others skilled in the art to which it appertains to make and use the same.

The object of my invention is to produce compounds containing sulfur, such as sulfur trioxid, ($SO_3$,) which evolve heat in their formation in such a manner that the temperature is prevented from rising to a point at which the compound desired is dissociated, whereby its continuous production is prohibited, and consists in simultaneously producing substances which absorb heat on their formation and the sulfur compound desired, the ingredients being so apportioned, adjusted, and disposed that the heat evolved during the formation of the sulfur compound is abstracted by the substance absorbing heat during its production to such a degree that the temperature is prevented from reaching the dissociating-point of the compound desired. This abstraction or absorbtion of heat by chemical means I term "chemical refrigeration."

My invention relates specifically to certain new and novel features and steps for performing a reaction between sulfur dioxid and gaseous oxidizing agents in the formation of sulfur trioxid, whereby a temperature sufficient to dissociate sulfur trioxid or preclude its formation is prohibited by abstracting the heat evolved in the formation of the sulfur trioxid by a simultaneously-produced substance which absorbs heat on its formation, the ingredients being so apportioned and disposed that the heat evolved by one is taken up by the other to such a degree as to practically prevent the accumulation of heat to an injurious point. By properly apportioning the reacting ingredients the process of making sulfur trioxid may be carried on continuously, the reaction being induced by the direct application of controlled heat in preference to heat dislodged, generated, or produced through the mediation of catalytic or condensation action of finely-divided metal or so-called "contact" substances, (*Ganot's Physics,*) such as platinized asbestos, &c., on gases present, which soon become inoperative by absorption, saturation of gases, or destructive action of injurious contaminations and can only be regenerated by expensive chemical process to regain their activity.

In carrying out my invention for the production of sulfur trioxid I proceed as follows, reference being had to the accompanying drawings, which illustrate a preferred form of apparatus which I employ for the purpose.

Figure 2:
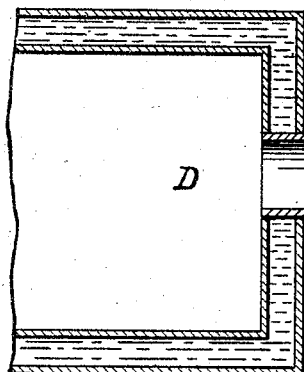
Figure 3:
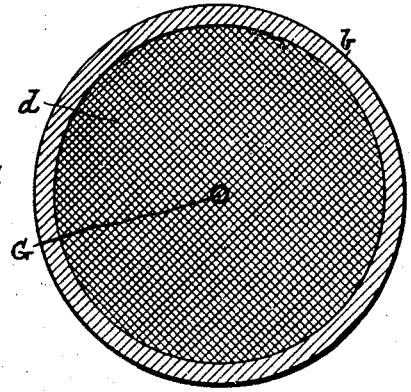
Figure 4:
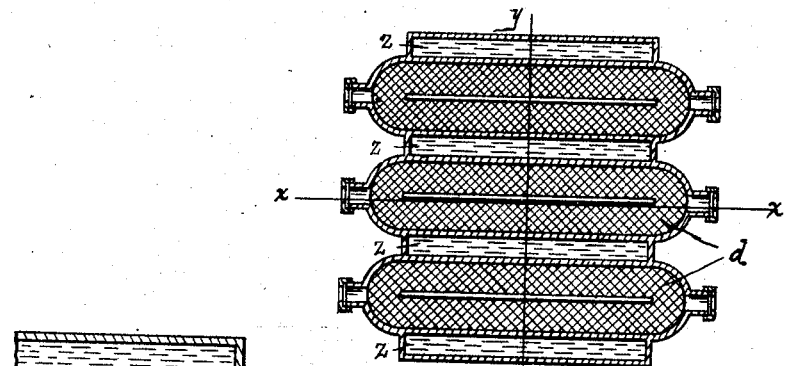
Figure 5:
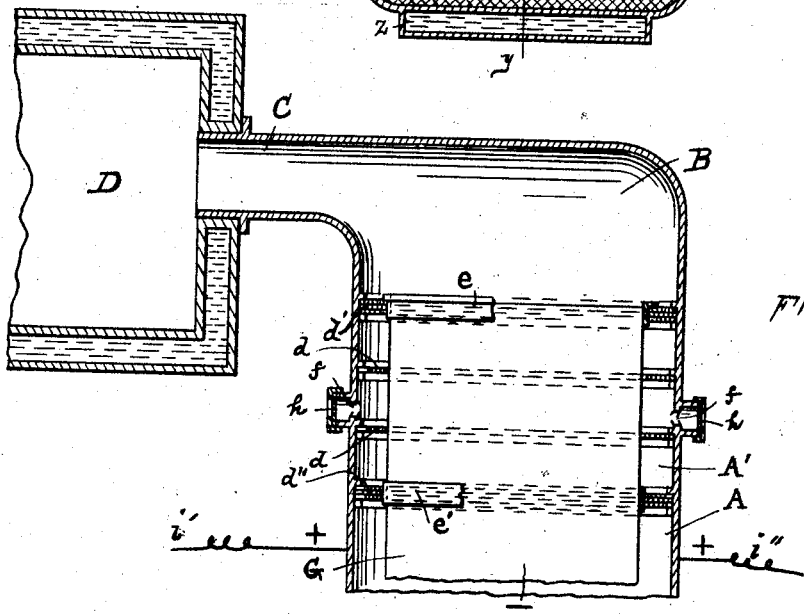
Figure 6:
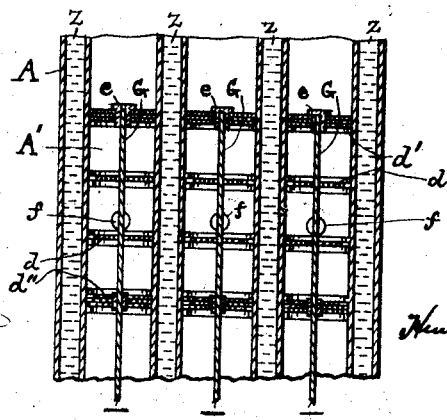

Referring to the drawings, Figure 1 is a vertical longitudinal section of my apparatus. Fig. 2 is an enlarged vertical section showing the electric diaphragms and the connections of the transforming-chamber. Fig. 3 is a cross-section of one of the rings of the electric connection of the transforming-chamber and an electric gauze diaphragm connected therewith. Fig. 4 is a transverse section of a modified form of apparatus, showing the transforming-compartments of elongated form and provided with water-jackets. Fig. 5 is a vertical longitudinal section of the apparatus on the lines $x\ x$, Fig. 4; and Fig. 6 is a transverse vertical section on the lines $y\ y$, Fig. 4.

Similar letters refer to corresponding parts in the several views.

The letter A designates a transforming-chamber of cylindrical or other form provided at its top with an elbow B and pipe C, the latter connected with a jacketed condenser D in any desired air-tight manner.

The lower end of the transforming-chamber A is provided with a detachable head E, having a central stuffing-box or screw-threaded plug F, of insulating material, connected therewith and in which is fitted a rod or electric connection G, the upper portion of which is formed in section having screw-threaded connections, as shown at $a\ a'\ a''$ in Fig. 2.

The transforming-chamber A, like the electric connection G, is partly composed of sections, as shown at $b\ b'\ b''$, (see Figs. 1 and 2,) the said sections being joined together by the threaded ends $c\ c'\ c''$.

A series of metallic-gauze diaphragms $d$, preferably of gold-plated copper, are arranged within the transforming-chamber A, the said diaphragms being securely held in relative positions by the abutting shoulders of the screw-threaded ends of the transforming-chamber rings and of the central connection thereof. The upper and lower diaphragms $d'$ and $d''$ are arranged in several thicknesses, forming a heat-absorber and flash-preventer and insulated from the electric connection G, as shown at $e\ e'$, for the purposes hereinafter fully described.

Peep-holes $f\ f'$, having mica fronts or covers $h\ h'$, are located at the opposite sides of the combustion or transforming compartment A' to enable the attendant to view the interior thereof and provide for regulating the apparatus as occasion may require.

The letters $i$ and $i'$ and $i''$ designate electric wires which are respectively connected with the electric conductor G and the walls of the transforming-chamber A by ordinary means.

The lower part of the transforming-chamber is provided horizontally with a pipe-section H, having a detachable end or head $h''$, within which is tightly fitted a tube $l$, the latter provided with a T-head $l'$ and an inlet-pipe $m$, while within the stem of the T-head and the tube $l$ is arranged a pipe $n$ for the purposes hereinafter fully specified.

In constructing an apparatus for carrying out my invention on a manufacturing scale it is found advisable not to have the heating gauze diaphragms $d\ d$ of a width greater than two inches from the central conductor on account of the tendency of the same to sag, become overheated, and fuse. I therefore prefer the form of apparatus as shown in Figs. 4, 5, and 6, wherein it is seen that the transforming-compartments are of elongated form and the central conductor instead of a rod consists of a strip of metal. This form of transforming apparatus is adapted to carry a heated gauze diaphragm of from three to four feet in length and four inches in width—$i.\ e.$, two inches on either side of the central conductor, which extends through the center of the transforming-compartment to within two inches of either end, as shown in Fig. 4. In constructing a battery of this form of apparatus it is advisable to separate the individual sections from each other by means of a water-jacket $z\ z$, which assists in maintaining the gases in a refrigerated condition, whereby the reaction is regulated by supply of heat thereto by means of heated gauze diaphragms. In all other particulars this preferred and modified form of apparatus is illustrated in Figs. 4, 5, and 6, in parts corresponding to Figs. 1, 2, and 3, except in form and construction, the same letters of reference referring to corresponding parts in the several views.

In the operation of my invention for the production of sulfur trioxid I introduce the sulfur dioxid through the pipe $m$ and gradually introduce a gaseous oxidizing compound, such as carbon dioxid, through the pipe $n$, allowing the two to enter in about equivalent proportions before reaction, whereupon they become thoroughly mixed in the lower part of transforming-chamber A. The mixed gases then pass up through the insulated gauze flash-preventer $d''$ into the transforming-compartment A'. A current of electricity is then passed through the connections $i\ i'\ i''$, the same passing through the diaphragms $d\ d$, heating them in proportion to the strength of the current, either low or to whiteness, the temperature being somewhat gaged by the color of the diaphragm, which can be observed through the mica-closed peep-holes $f\ f'$. As the mixture of sulfur dioxid and carbon dioxid comes in contact with the heated gauze diaphragms a reaction takes place, which may be illustrated by the following chemical formula or equation: $SO_2 + CO_2 = SO_3 + CO$. It will be observed that the reaction which here takes place is of endothermic nature and that the oxidizing compound is reduced, producing a by-product of endothermic or heat-absorbing character—that is to say, heat has to be supplied to the mixture to maintain the reaction or oxidation and can only reach the point of dissociation of the sulfur trioxid by the excessive application of external heat.

In inducing the reaction between sulfur dioxid and a gaseous oxidizing compound I heat the igniting gauze diaphragms $d\ d$ to a bright red by passing a current of electricity therethrough and then gradually pass the sulfur dioxid and gaseous oxidizing compound, such as carbon dioxid, through the same. As the mixture of sulfur dioxid and carbon dioxid pass through the diaphragm $d\ d$, heated to bright redness, a reaction takes place, the carbon dioxid at that temperature assuming oxidizing properties and gives up a portion of its oxygen to the gaseous sulfur dioxid, producing sublimed sulfur trioxid and carbonic oxid, which products are rapidly conveyed from the heated sphere in juxtaposition to the diaphragm by the current of flowing gas therethrough.

Care must be taken not to pass the mixture of carbon dioxid and sulfur dioxid through the diaphragm at a greater speed than will cool the diaphragm below a bright red heat, as the reduction of the carbon dioxid to carbonic oxid and simultaneous oxidation of sulfur dioxid to sulfur trioxid requires the addition of heat, for the reason that the by-product—carbonic oxid—absorbs a large portion of latent heat, which heat had previously been liberated by oxidation to carbon dioxid.

It is well known that the oxidation of sulfur dioxid by means of oxygen *per se* liberates heat in such quantity as to eventually accumulate to a temperature which prevents the formation of sulfur trioxid unless the sensible heat is mechanically abstracted. By my process the liberation of sensible heat in the oxidation of sulfur dioxid is entirely prevented, so that the sulphur dioxid becomes oxidized by what is termed an "endothermic reaction"—*i. e.*, heat is absorbed during the reaction instead of being liberated and must naturally be supplied thereto to maintain it. The reason for this fact is that during the combination of carbon and oxygen in the production of carbon dioxid more sensible heat is liberated than is liberated by the union of oxygen and sulfur dioxid. Therefore by oxidizing sulfur dioxid with this gaseous oxidizing agent the heat by union of which has been disengaged must be added to perform and maintain the reaction or oxidation of the sulfur dioxid therewith, and consequently the temperature cannot rise to the dissociating-point of sulfur trioxid unless the heat is supplied in excessive quantities from an exterior source. It will be observed that the heated sphere in juxtaposition to the diaphragm is maintained at a bright red, at which temperature carbon dioxid acts as an oxidizing agent. The products passing therethrough are rapidly conveyed outside of the sphere at which the heat is supplied—*i. e.*, in juxtaposition to the diaphragm—so that decomposition by by-products is thus prevented thereafter.

The proportion of gases in case sulfur dioxid and carbon dioxid are employed is preferably in volume of two parts of carbon dioxid to one part of sulfur dioxid, the object being to have an excess of carbon dioxid, the presence of which prevents the reduction of sulfur trioxid by the carbonic oxid by-product as the gases cool after reaction. After the sulfur trioxid and carbonic oxid are thus produced by means of endothermic reaction they are conveyed through the water-jacketed condenser D, where the sulfur-trioxid sublimate is condensed, and the carbonic oxid, with excess of carbon dioxid, conducted therefrom, the carbonic oxid oxidized by burning to carbon dioxid and employed again as before. The carbonic oxid in this process merely acts as a carrier of oxygen, whereby the oxidation of sulfur dioxid is performed without liberation of sensible heat.

The current of gases introduced passing rapidly through the apparatus carries the principal product of reaction—*i. e.*, sulfur trioxid—quickly through and away from the heated gauze diaphragms, and at the same time it is cooled by the surrounding body of gases and then passes through the flash-preventer $d'$, which consists of a number of layers of gauze insulated, as before described, from the central conductor, and thus also acts as a strainer or absorbent of any excess of heat absorbed from the heated diaphragms and conveys it away, the sulfur trioxid being finally condensed in the jacketed condenser D, from which it may be removed from time to time, as desired, while the carbonic oxid or other reduced oxidizing gaseous medium may be reoxidized and employed in future operations.

It will be observed that the transforming-compartment $A'$, in which the electrically-heated diaphragms are located, is protected at the inlet and outlet portions with heavy insulated gauze sections which prevent the ignited mixture of gases in said compartment from conveying the flash or oxidizing reaction outside of the compartment and admits of controlling the temperature and the product by the rapidity of the admission of gases thereto during transformation. The electric diaphragms $d\,d$ being maintained at a uniform temperature by carefully regulating the temperature of the electric diaphragms $d\,d$ in conformity with the rapidity of flow of gases introduced, the production of sulfur trioxid may be carried on continuously without interruption.

It is obvious that I can introduce any other compound gaseous oxidizing agent with the carbon dioxid, such as nitrogen oxid, &c., mixed with sulfur dioxid and inducing a reaction between the same, by continuously supplying heat thereto in such proportion as to maintain the reaction or oxidation of the sulfur dioxid, but not to such a degree as to elevate the temperature to the dissociating-point of sulfur trioxid, at which time the oxidation of sulfur dioxid would be precluded.

It can be readily seen that the heated diaphragms $d\,d$ in the transforming-compartment $A'$ serve to supply the heat whereby a reaction is induced between the sulfur dioxid and the gaseous oxidizing compound as it comes in contact therewith, and the excess of heat absorbed therefrom by the passing gases or products of reaction is primarily removed or absorbed by the rapid-flowing gases admitted and the heat-absorbing diaphragm $d'$.

It is obvious that by my process the oxidation of sulfur dioxid produced by reaction between sulfur dioxid and a gaseous oxidizing compound is induced and maintained by a positive and controlled means—viz., the electrically-heated gauze diaphragm through which the mixture of gases have to pass— and therefore is not subject to the difficulties found or met with in employing catalytic or contact substances, which soon become inoperative by absorption or saturation of gases and can only be reused by expensive process of separation and regeneration.

The products of reaction in the case of the employment of carbon dioxid as an oxidizing agent with sulfur dioxid are sulfur trioxid and carbonic oxid, which products are conveyed through the condenser D, where the sulfur trioxid condenses in crystalline form and the by-product—viz., carbonic oxid—reconducted to a reservoir from which it can be again employed from time to time by oxidizing the same, mixing it with more sulfur dioxid, and conveying the mixture through the apparatus and the transforming-compartment A', whereby the process may be carried on in a continuous and uninterrupted manner.

I do not desire to confine myself to any particular gaseous oxidizing compound, but have found nitrogen-oxid and carbon-dioxid mixture to be the most efficient, the principal object being to oxidize sulfur dioxid to sulfur trioxid by the action of a gaseous oxidizing compound, the reaction of which on the sulfur dioxid is of endothermic nature.

The term "gaseous" as employed herein with reference to oxidizing agents for transforming sulfur dioxid into sulfur trioxid is intended to include a vaporized oxidizing compound capable of producing sulfur trioxid from sulfur dioxid as well as an oxidizing gas *per se*.

The term "by means other than catalysis" as employed in this specification and preamble to certain claims is intended to imply a means for inducing reaction between the ingredients by the direct action of heat supplied thereto rather than heat dislodged, generated, or produced from the surrounding gases by the catalytic or condensation action of so-called "catalytic" substances thereon or union induced by the condensation produced thereby.

The term "endothermic by-product" as employed herein designates the thermic character of the by-product or residue of the process with relation to the product produced and oxidizing agent employed. For example, in the case described employing carbon dioxid ($CO_2$) as oxidizing agent it is well known that the by-product, carbonic oxid, (CO,) contains more heat units than carbon dioxid, ($CO_2$,) because heat is given out on producing carbon dioxid ($CO_2$) from carbonic oxid (CO) by combination with oxygen. Therefore on deoxidizing or reducing carbon dioxid ($CO_2$) to carbonic oxid (CO) the carbonic oxid must be endothermic or heat-absorbing with relation to carbon dioxid.

It should be noted that as the sulfurous gas comes in contact with the gold-plated copper gauze it combines therewith, forming a coating of gold-copper sulfid, which prevents further action on the metal parts and isolates the metal from further contact with the surrounding gases or fluids, but does not prevent the passage of heat therethrough for the purpose of inducing reaction or combination between the sulfur dioxid and oxygen of the endothermic oxidizing agent when the gauze is subjected to the action of an electric current. This coating permanently remains thereafter, isolating the metal parts from the gases and preventing contact therewith during its further employment.

Having now described my invention, what I claim as new, and desire to secure by Letters Patent, is—

1. The process of making sulfur trioxid which consists in inducing the oxidation of sulfur dioxid with a gaseous oxidizing substance capable of producing an endothermic reaction, by supplying heat thereto, and keeping the temperature from rising to the dissociating-point of sulfur trioxid by controlling the heat supplied.

2. The process of making sulfur trioxid which consists in inducing an endothermic reaction between sulfur dioxid and a gaseous oxidizing substance by the action of heat and maintaining the reaction continuously by conveying thereto a gaseous substance containing sulfur dioxid and oxidizing compound and preventing the temperature from rising to the dissociating-point of sulfur trioxid by controlling the heat supplied.

3. The process of making sulfur trioxid which consists in supplying to a gaseous mixture containing sulfur dioxid and an oxidizing compound enough heat to induce an endothermic reaction between the same and maintaining the temperature below the dissociating-point of sulfur trioxid by regulating the supply of heat thereto.

4. The process of making sulfur trioxid which consists in performing a reaction between sulfur dioxid and a gaseous substance capable of producing an denothermic reaction by passing the said mixture through a compartment wherein sufficient heat is supplied to induce a reaction and maintain the same below the dissociating-point of sulfur trioxid by controlling the heat supplied thereto.

5. The process of making sulfur trioxid by direct thermal action which consists in inducing an endothermic reaction between sulfur dioxid and a gaseous oxidizing agent by supplying sufficient heat thereto and maintaining the reaction by continuing the supply of the mixture of gases and heat.

6. The process of making sulfur trioxid which consists in oxidizing sulfur dioxid by means of endothermic reaction with a gaseous oxidizing compound induced and maintained by supplying sufficient heat thereto to neutralize the deficiency therein.

7. The process of making sulfur trioxid by direct thermal action which consists in supplying that quantity of heat to a mixture of sulfur dioxid and carbon dioxid which will induce a reaction between the same without elevating the temperature of the mixture to the dissociating-point of sulfur trioxid.

8. The continuous process of making sulfur trioxid by direct thermal action, which consists in mixing sulfur dioxid with a gaseous oxidizing agent capable of producing an endothermic reaction, conveying the same through an igniting or transforming chamber, supplying heat thereto therein, conveying the products into a condenser, condensing the sulfur dioxid produced therefrom, oxidizing the gaseous by-product, mixing the same with more sulfur dioxid and continuing the process as hereinbefore set forth.

9. The process of making sulfur trioxid which consists in simultaneously oxidizing sulfur dioxid and producing a substance capable of absorbing heat during its formation, and abstracting the heat evolved during the oxidation of the sulfur content by the action of the substance absorbing heat during its formation, whereby the temperature is prevented from rising to the dissociating-point of sulfur trioxid.

10. The process of making a compound consisting of one atom of sulfur and three atoms of oxygen which consists in uniting substances forming the same and simultaneously producing a substance capable of absorbing heat during its formation, and apportioning and disposing the ingredients so that the heat which would result in the formation of one is absorbed by the other to such a degree that the generation of a temperature sufficient to dissociate sulfur trioxid is avoided.

11. The process of making compounds containing sulfur which evolve heat on their formation which consists in uniting substances forming the same and simultaneously producing a substance capable of absorbing heat during its formation, and apportioning and disposing the ingredients so that the heat which would be evolved in the formation of one is absorbed by the other to such a degree that the generation of a temperature sufficient to dissociate the sulfur compound desired is avoided.

12. The process of making compounds containing sulfur which evolve heat on their formation which consists in uniting gaseous substances forming the same, and simultaneously producing a substance capable of absorbing heat during its formation, and apportioning and disposing the ingredients so that the heat which would be evolved in the formation of one is absorbed by the other to such a degree that the generation of a temperature sufficient to dissociate the sulfur-containing compound is avoided.

13. The process of making compounds of sulfur and oxygen which evolve heat on their formation which consists in uniting substances forming the same, and simultaneously producing a substance capable of absorbing heat during its formation, and apportioning and disposing the ingredients so that the heat which would be evolved in the formation of one is absorbed by the other to such a degree that the generation of a temperature sufficient to dissociate the sulfur-oxygen compound is avoided.

14. The process of making compounds of sulfur and oxygen which evolve heat on their formation which consists in uniting gaseous substances forming the same and simultaneously producing a substance capable of absorbing heat during its formation, and apportioning and disposing the ingredients so that the heat which would result in the formation of one is absorbed by the other to such a degree that the generation of a temperature sufficient to dissociate the sulfur-oxygen compound is avoided.

15. The process of making compounds which evolve heat during their formation which consists in uniting substances forming the same and simultaneously producing a substance which will absorb heat during its formation, and apportioning and disposing the ingredients so that the heat which would be evolved by one is absorbed in the formation of the other to such a degree that a temperature sufficient to dissociate the compound desired is avoided.

16. The process of making substances which are unstable at elevated temperatures and which evolve heat on their formation which consists in providing materials which upon reaction form such substance and providing materials which will produce a substance which will absorb heat on its formation and then apportioning and disposing the ingredients so that the heat which would be evolved in the formation of one substance is absorbed in the formation of the other to such a degree that a temperature sufficient to dissociate the substance desired is avoided and finally causing the said ingredients to react simultaneously.

17. The process of making substances which are unstable at elevated temperatures and which evolve heat on their formation which consists in exposing the said substance during its formation to the action of chemical refrigeration.

18. The process of making compounds containing sulfur which evolve heat during their formation which consists in exposing the said sulfur-containing substance during its formation to the action of chemical refrigeration.

19. The process of making compounds of sulfur and oxygen which consists in oxidizing sulfur while subjecting it to chemical refrigeration.

20. The process of making sulfur trioxid which consists in oxidizing sulfur dioxid while subjecting it to chemical refrigeration.

In testimony whereof I affix my signature in presence of two witnesses.

HENRY SPENCER BLACKMORE.

Witnesses:
WARREN C. STONE,
C. C. WRIGHT.